3,146,257
PROCESS FOR PREPARING THE SEMINITRILE OF BETA-HYDROMUCONIC ACID, ITS CHLORIDE AND ITS LOWER ESTERS, AND PRODUCTS THEREOF
Gian Paolo Chiusoli, Novara, Italy, assignor to Montecatini Societa Generale per l'Industria Mineraria e Chimica, Milan, Italy
No Drawing. Filed Nov. 12, 1958, Ser. No. 773,139
Claims priority, application Italy Nov. 14, 1957
17 Claims. (Cl. 260—465.4)

This invention relates to processes for preparing certain omega-carboxylic derivatives of 1-cyano-2-butene by reacting 4-chloro-1-cyano-butene-2 with nickel carbonyl under pressure of carbon monoxide. It also relates to new compounds made by such processes.

The said derivatives are the seminitrile of beta-hydromuconic acid, its lower esters, particularly the methyl and the ethyl esters, and also the respective acid chloride. These derivatives are useful as intermediates for preparing epsilon-amino-capronic acid and caprolactam, by hydrolysis and catalytic hydrogenation. The latter, in turn, serve to prepare polyamide fibres. The synthesis of these derivatives of dihydromuconic acid, from chlorocyanobutene, carbon monoxide and nickel carbonyl, is an object of the present invention.

According to the present invention the introduction of a carboxylic function into the 4-chloro-1-cyano-butene-2 molecule is obtained by reaction with CO and nickel carbonyl.

A principal advantage of the process is that it permits the obtainment of said derivatives in a single operation carried out under extremely mild conditions, of temperature and pressure. In this process chlorocyanobutene is reacted with nickel carbonyl under carbon monoxide pressure, with or without organic solvents, but preferably in the presence of mixtures of water with alcohols or in the presence of water only. Where organic solvents are employed they should preferably be capable of dissolving nickel carbonyl and chlorocyanobutene. The process is carried out at temperatures between 0 and 150° C. and at a pressure preferably between 1 and 300 atm.

The amount of nickel carbonyl used is generally that corresponding to the chlorine to be removed from chlorocyanobutene, to form nickel chloride. Higher amounts may however be employed without causing any damage.

The conversion of chlorocyanobutene depends on time, on temperature and on pressure. For instance, it is not convenient to operate at less than 1 atm. if the temperature is 25° C., or at more than 20 atm. This is so because, on the one hand, reaction with nickel carbonyl without the carbon monoxide pressure leads to the dimeric product dicyanoctadiene, while, on the other hand, the decomposition of the nickel carbonyl is hindered by too high a pressure and therefore the chlorocyanobutene is not easily converted. The retarding effect of pressure ceases almost completely at temperatures higher than 100° C. For instance at 10 atm. and 25° C. the proportion of chlorocyanobutene unconverted after 24 hours is about 50% but at 300 atm. it is higher than 80%. In contrast, when operating at a pressure of 10 atm. and at 60° C. the conversion is almost complete after 6 hours, and the same occurs at 100 atm. and 100° C.

Increasing the temperature is advantageous in order to increase the conversion. However, a limit is set by the tendency of the CN group to be saponified in the presence of water or alcohols to form the acid or ester. Hence, if rapid reactions and total conversions are desired, operation should be carried out at temperatures higher than room temperature but not higher than 60° C. It is preferable, when the reaction is carried out with water or alcohols as reactants, at temperatures above 60° C., to employ a great excess of inert organic solvents, such as benzene, acetone, or dioxane. The organic solvents hinder or suppress the undesired hydrolysis of the nitrile radical. For this purpose it is also advantageous to add buffers such as calcium carbonate, magnesium carbonate, and sodium monophosphate, the pH being kept below 7. However, it should be borne in mind that the reaction is hindered by the alkaline medium owing to the susceptibility of chlorocyanobutene to dehydrochlorination. Also, the use of bicarbonate decreases the yield of seminitrile.

The reaction may also be carried out in inert solvents such as benzene, without any water or alcohols, or in the absence of solvents. In these cases the product is the chloride of dihydromuconic seminitrile, a compound not yet described in literature, which distils at from 118° C. to 120° C. at 10 mm. Hg and can be easily hydrolysed by conventional methods to the corresponding acid or ester thereof.

To carry out the synthesis it is convenient to use materials resisting the corrosive action of hydrochloric acid.

The formation of the semi-esters of dihydromuconic seminitrile, of dihydromuconic seminitrile itself, and of the chloride of the acid, are each diagrammatically represented in the following reaction schemes:

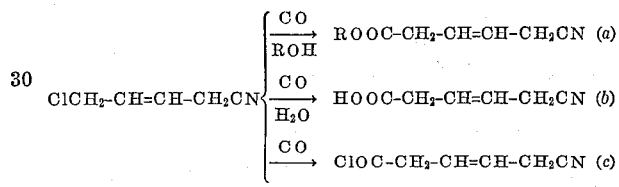

The separation of the products is carried out by fractionation under vacuum. Where the seminitrile of dihydromuconic acid is formed, it can be separated by salifying with bases and re-acidifying with acids the aqueous solution of the salt. If unreacted chlorocyanobutene is present it is advantageous to neutralize accurately, preferably with sodium bicarbonate, to avoid the dehydrochlorination of chlorocyanobutene. Excess nickel carbonyl, if present, is also recovered by distillation. All transformed nickel carbonyl is recovered as an aqueous nickel chloride solution, which can be easily converted again into nickel carbonyl, by known methods. A number of illustrative examples are reported hereinbelow, without intent to limit the scope of the present invention.

*Example 1*

10 g. of chlorocyanobutene

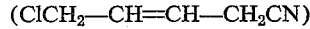

and 10 g. of nickel carbonyl are dissolved together in 80 ml. of methyl alcohol at 25° C., at a pressure of 2 atm. of carbon monoxide, in a glass vessel contained in a 500 ml. capacity rocking autoclave. Rocking is kept going for 48 hours. 4 g. of nickel carbonyl react. The unreacted nickel carbonyl and alcohol are removed by distillation. The residue is taken up with water, the aqueous layer containing nickel chloride is separated, and the organic layer is distilled. Thereby 6.5 grams of methyl semiester of dihydromuconic seminitrile with a boiling point of 135–140° C./13 mm. Hg are obtained. This is a new compound not previously described in the literature.

*Example 2*

40 g. of nickel carbonyl are added at 25° C. to 50 g. of chlorocyanobutene dissolved in 120 ml. of 90% ethyl alcohol in a 500 ml. capacity autoclave at a pressure of 2 atm. of carbon monoxide. The mixture is agitated for 24 hours. The unreacted nickel carbonyl and alcohol are distilled at atmospheric pressure. By vacuum distillation of the product, 27 g. of unreacted chlorocyanobutene and 5 g. of seminitrile of dihydromuconic acid (175–180° C./13 mm. Hg), and also 10 g. of its ethyl ester (140–145°/13 mm. Hg), are recovered.

*Example 3*

25 g. of chlorocyanobutene in 100 ml. of absolute ethyl alcohol are treated at 15° C. with 20 g. of Ni(CO)$_4$ at a CO pressure of 40 atm. The mixture is heated to 100° C. for 5 hours. By vacuum distillation of the product at 130–145° C./10 mm. Hg a mixture of 10 g. of the ester of the seminitrile and of 5 g. of the diester of dihydromuconic acid are obtained.

*Example 4*

20 g. of Ni(CO)$_4$ are added to 25 g. of chlorocyanobutene in 100 ml. of 95% ethyl alcohol at 15° C. at a CO pressure of 200 atm. in a one litre capacity autoclave. The temperature is raised to 100° C. and kept for 5 hours. The alcohol is distilled off and the residue is extracted with ether. The raw product thus obtained contains 4.9% of nitrogen. It is saponified with a 36% hydrochloric acid solution by refluxing for 30 minutes. 15 g. of dihydromuconic acid, melting point 192–195° C., are recovered. In another identical run neutralization is carried out with alkali, after distilling off the alcohol and extracting with ether. From the aqueous solution 6 g. of dihydromuconic acid are recovered after saponification. By distilling the neutral portion at 130–150° C./10 mm. Hg, 8 g. of semiester of seminitrile and 4 g. of dihydromuconic diester are obtained.

*Example 5*

Operation is carried out as in Example 4 but in the presence of CaCO$_3$ (buffer). By distillation 13 g. of semiester of dihydromuconic seminitrile are obtained.

*Example 6*

20 g. of nickel carbonyl are added at room temperature to 25 g. of chlorocyanobutene in 120 ml. of acetone and 20 ml. of methyl alcohol at a CO pressure of 40 atm. The mixture is heated to 100° C. for 5 hours. By distilling the product 15 g. of methyl semiester of dihydromuconic seminitrile are obtained.

*Example 7*

50 g. of chlorocyanobutene in 180 cc. of 95% ethyl alcohol are treated at 15° C. with 40 g. of Ni(CO)$_4$ in a 500 ml. capacity autoclave at a CO pressure of 10 atm. The mixture is heated to 60° C. for 5 hours while stirring steadily. The transformation of the chlorocyanobutene is almost complete. By distilling the product, 18 g. of ethyl semiester of dihydromuconic seminitrile and 7 g. of seminitrile of dihydromuconic acid are obtained.

*Example 8*

To 50 g. of chlorocyanobutene, 20 ml. of water and 200 ml. of acetone in a 500 ml. capacity autoclave are added 40 g. of nickel carbonyl at 15° C. at a CO pressure of 10 atm. The autoclave is kept agitated at 50° C. for 7 hours. The unreacted nickel carbonyl and the acetone are distilled off. The product is neutralized with sodium bicarbonate, the aqueous solution is acidified again, and about 6 g. of seminitrile of dihydromuconic acid are extracted with ether.

*Example 9*

25 g. of chlorocyanobutene dissolved in 80 ml. of benzene rendered anhydrous by drying over sodium, and 10 g. of nickel carbonyl are mixed at room temperature at a CO pressure of 40 atm. The mixture is heated to 100° C. for 5 hours. By distilling the product, chlorocyanobutene and 6 g. of the chloride of dihydromuconic seminitrile (118–120° C./10 mm. Hg) are obtained. By treatment with water and bicarbonate the seminitrile of dihydromuconic acid is extracted.

*Example 10*

25 g. of chlorocyanobutene and 10 g. of nickel carbonyl, treated as in the first part of Example 9, but in the absence of any solvent, yield 5 g. of the chloride of dihydromuconic seminitrile.

I claim:

1. A process of making the chloride of dihydromuconic seminitrile, of the formula

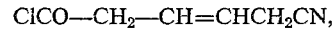
$$ClCO-CH_2-CH=CHCH_2CN,$$

comprising treating chlorocyanobutene, of the formula ClCH$_2$CH=CHCH$_2$CN, with nickel carbonyl and carbon monoxide, at a carbon monoxide pressure of 1 to 300 atmospheres, and at a temperature of 0° to 150° C.

2. The process of claim 1, the lower pressures of the pressure range recited being employed with the lower temperatures of the temperature range recited.

3. The process of claim 2, the process being carried out in the presence of acetone.

4. A process of making the chloride of dihydromuconic seminitrile, of the formula

$$ClOC-CH_2-CH=CH-CH_2CN,$$

comprising treating chlorocyanobutene of the formula ClCH$_2$-CH=CHCH$_2$CN with nickel carbonyl and carbon monoxide, at a carbon monoxide pressure of 10 to 300 atmospheres, and at a temperature between 80° and 120° C.

5. The process comprising making the chloride of dihydromuconic seminitrile, of the formula

$$ClOC-CH_2-CH=CH-CH_2CN,$$

by treating 4-chloro-1-cyano-butene-2 with nickel carbonyl and carbon monoxide at a carbon monoxide pressure between about 10 to 300 atmospheres, at between about 80° and 120° C., and thereafter treating the said chloride with water to produce the seminitrile of dihydromuconic acid.

6. A process of making the seminitrile of dihydromuconic acid, of the formula

$$HOOC-CH_2-CH=CH-CH_2CN,$$

comprising treating 4-chloro-1-cyano-butene-2 with water and nickel carbonyl and carbon monoxide, at a carbon monoxide pressure of 1 to 300 atmospheres, and at a temperature between 0° and 150° C., the amount of nickel carbonyl being at least that required to supply the nickel needed to form nickel chloride with the chlorine of the said butene.

7. A process of making the seminitrile of dihydromuconic acid, of the formula

$$HOOC-CH_2-CH=CH-CH_2CN,$$

comprising treating 4-chloro-1-cyano-butene-2 with water and nickel carbonyl and carbon monoxide, at a carbon monoxide pressure of 2 to 50 atmospheres, and at a temperature between 15° and 100° C.

8. A process of making the seminitrile of dihydromuconic acid, of the formula

$$HOOC-CH_2-CH=CH-CH_2CN,$$

comprising treating 4-chloro-1-cyano-butene-2 with water and nickel carbonyl and carbon monoxide, at a carbon monoxide pressure of 1 to 300 atmospheres, and at a temperature between 0° and 150° C., the process being carried out in an organic solvent which is inert in the reaction and is used in a volume in excess of the water, to diminish saponification of the nitrile group.

9. A process of making the seminitrile of dihydromuconic acid, of the formula

$$HOOC-CH_2-CH=CH-CH_2CN,$$

comprising treating 4-chloro-1-cyano-butene-2 with water and nickel carbonyl and carbon monoxide, at a carbon monoxide pressure of 1 to 300 atmospheres, and at a temperature between 0° and 150° C., the hydrolysis of the nitrile group being at least in part suppressed by adding alkaline reacting buffers, the pH being kept below 7.

10. A process of making an alkyl ester of the seminitrile of dihydromuconic acid, of the formula $$ROOC—CH_2—CH=CH—CH_2CN,$$

in which R is an alkyl radical having from 1 to 4 carbon atoms, comprising treating 4-chloro-1-cyano-butene-2 with nickel carbonyl, an alkanol having from 1 to 4 carbon atoms, and carbon monoxide, at a carbon monoxide pressure of 1 to 300 atmospheres, and at a temperature between 0° and 150° C., the amount of nickel carbonyl being at least that required to supply the nickel needed to form nickel chloride with the chlorine of the said butene.

11. The process of claim 10, the alcohol being methanol, R being methyl.

12. The process of claim 10, the alcohol being ethanol, R being ethyl.

13. A process of making an alkyl ester of the seminitrile of dihydromuconic acid, of the formula $$ROOC—CH_2—CH=CH—CH_2CN,$$

in which R is an alkyl radical having from 1 to 4 carbon atoms, comprising treating 4-chloro-1-cyano-butene-2 with nickel carbonyl, an alkanol having from 1 to 4 carbon atoms, and carbon monoxide, at a carbon monoxide pressure of 2 to 50 atmospheres, and at a temperature between 15° and 100° C., the amount of nickel carbonyl being at least that required to supply the nickel needed to form nickel chloride with the chlorine of the said butene.

14. A process of making an alkyl ester of the seminitrile in dihydromuconic acid, of the formula $$ROOC—CH_2—CH=CH—CH_2CN,$$

in which R is an alkyl radical having from 1 to 4 carbon atoms, comprising treating 4-chloro-1-cyano-butene-2 with nickel carbonyl, an alkanol having from 1 to 4 carbon atoms, and carbon monoxide, at a carbon monoxide pressure of 1 to 300 atmospheres, and at a temperature between 0° and 150° C., the process being carried out in an organic solvent which is inert in the reaction and which is employed in a volume in excess of the alcohol, to diminish saponification of the nitrile group, the amount of nickel carbonyl being at least that required to supply the nickel needed to form nickel chloride with the chlorine of the said butene.

15. A process of making an alkyl ester of the seminitrile of dihydromuconic acid, of the formula $$ROOC—CH_2—CH=CH—CH_2CN,$$

in which R is an alkyl radical having from 1 to 4 carbon atoms, comprising treating 4-chloro-1-cyano-butene-2 with nickel carbonyl, an alkanol having from 1 to 4 carbon atoms, and carbon monoxide, at a carbon monoxide pressure of 1 to 300 atmospheres, and at a temperature between 0° and 150° C., the saponification of the nitrile group being at least in part suppressed by adding alkaline reacting buffers, the pH being kept below 7.

16. The process of preparing the seminitrile of dihydromuconic acid alkanol ester, which comprises treating 4-chloro-1-cyano-butene-2 with nickel carbonyl and carbon monoxide at a carbon monoxide pressure between about 10 to 300 atmospheres, at between about 80° and 120° C., to yield the chloride of dihydromuconic seminitrile, and thereafter treating said chloride with an alkanol having from 1 to 4 carbon atoms to yield the seminitrile of dihydromuconic acid alkanol ester.

17. The chloride of dihydromuconic seminitrile, of the formula: $ClOC—CH_2—CH=CH—CH_2CN$.

References Cited in the file of this patent
UNITED STATES PATENTS

| | | |
|---|---|---|
| 2,224,022 | Kurtz | Dec. 3, 1940 |
| 2,391,251 | Long | Dec. 18, 1945 |
| 2,458,423 | Reynolds et al. | Jan. 4, 1949 |
| 2,469,836 | Milone | May 10, 1949 |
| 2,542,767 | Gresham et al. | Feb. 20, 1951 |
| 2,556,271 | Groombridge | June 12, 1951 |

OTHER REFERENCES

Reppe: "Acetylene Chemistry," P.B. Report 18852–5 (Translated from the German), 1949, page 152.

Chiusoli: Gazzetta Chimica Italiana, vol. 89, 1959, pages 1332 to 1337.